June 14, 1966   M. FIDELMAN   3,256,504
GALVANIC HYDROGEN PRODUCER
Filed Jan. 11, 1961
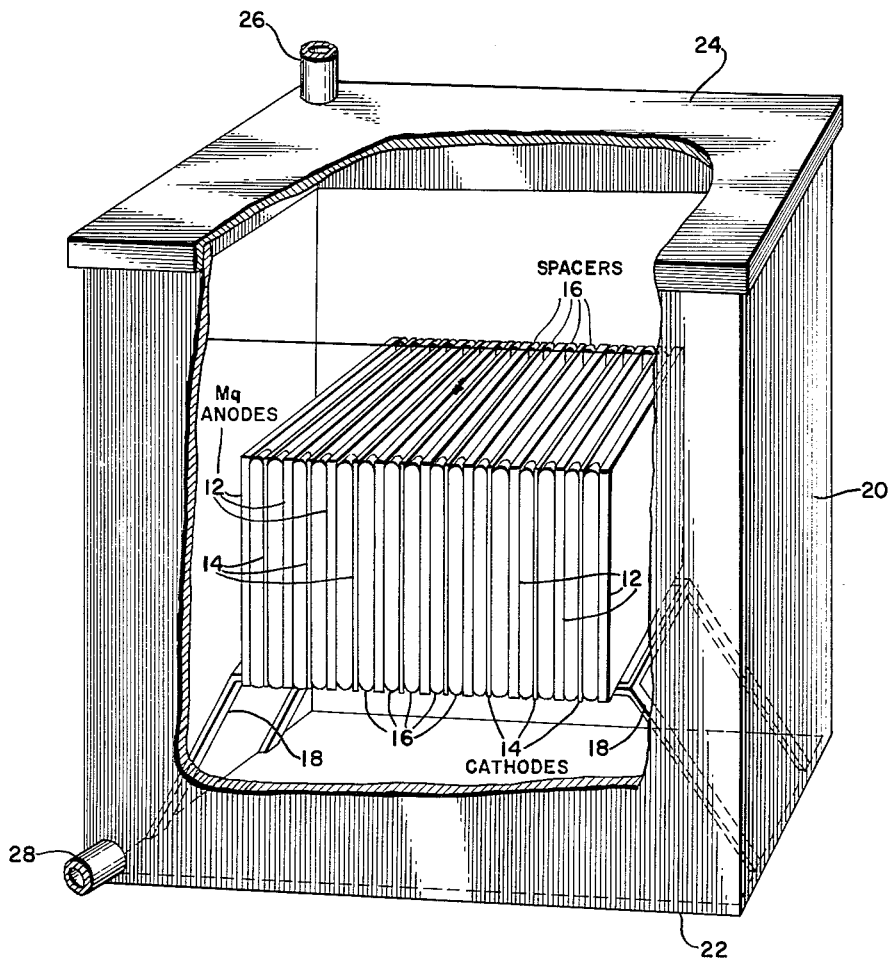

3,256,504
GALVANIC HYDROGEN PRODUCER
Morris Fidelman, Prince Georges County, Md.
(2004 Van Buren St., W. Hyattsville, Md.)
Filed Jan. 11, 1961, Ser. No. 82,080
5 Claims. (Cl. 204—248)

This invention relates to the production of hydrogen through the reaction of magnesium with water, the reaction being effected by galvanically coupling magnesium with an active inert metal in saline water.

Metallic magnesium is a reactive metal with a theoretical potential high enough even to have created considerable interest in the possibility of employing the magnesium-water reaction galvanically as a source of electrical energy through the reaction:

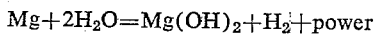

$$Mg + 2H_2O = Mg(OH)_2 + H_2 + power$$

However, employment of this galvanic reaction solely for production of hydrogen has not been seriously considered by the art, principally because the construction details which permit production of electrical energy are virtually inconsistent with rapid evolution of hydrogen. An effective external short circuit so that a magnesium-water primary battery can be used as a hydrogen generator is simply not feasible. The various design characteristics of these power generating devices make them too large, or too complex, or too expensive for generation of hydrogen. Under short circuit conditions even the efficient magnesium galvanic cells disclosed in related copending applications S.N. 749,363 and 749,008 now Patents 3,036,141 and 3,036,142 generate hydrogen at but a small fraction of the rates desired for a hydrogen producer.

The object of the instant invention is to provide a device employing the magnesium-water reaction which rapidly generates hydrogen at a uniform rate.

Further objects and the advantages of the instant invention will be apparent from the following description of the invention and its relationship to the art.

Elemental hydrogen is in wide-spread and large-scale use throughout the world. In large quantities, e.g. for the production of ammonia, hydrogen can be supplied at an exceedingly low cost. Unfortunately the unit cost of hydrogen climbs sharply as the demand level decreases. Moderate quantities of hydrogen have been commercially supplied by cracking ammonia or by electrolytically decomposing water, both relatively high cost expedients. The demand for very small quantities of hydrogen has been filled commercially by shipment of compressed hydrogen from a central source, as cylinder hydrogen. This expedient commonly involves shipment of about 100 pounds of cylinder for every 100–200 standard cubic feet of hydrogen. An alternative expedient for generating small quantities of hydrogen is the reaction of aluminum chips and caustic soda with water. This last expedient is commonly employed for filling meteorological balloons. When the need does not exceed a couple of hundred cubic feet, hydrogen is a high cost material whose use most often involves the inconvenience either of operating a potentially dangerous chemical generator or of handling heavy high pressure cylinders. A clearcut need exists for a safe and simple way to generate hydrogen in small quantities not more than about two pound moles, that is less than 1000 cubic feet. The instant device is intended to fill the need.

Briefly stated, the instant invention comprises: an internally short circuited single galvanic cell made of a plurality of magnesium anode and inert metal cathode plates assembled together as a unit; an enclosed generator housing for containing said galvanic cell assembly, and enough saline water inside the housing to provide a water to magnesium weight ratio of at least 5:1. Appropriate hydrogen outlet valves and water inlet valves may be incorporated on the generator housing.

The basic galvanic couple employed for the practice of the instant invention comprises magnesium as the anode, an aqueous saline electrolyte and an inert metal as the cathode. For the anode sheets, either pure magnesium or high magnesium content alloys may be used. The term "magnesium" as employed herein is intended to include both pure magnesium and high magnesium content alloys.

The cathode is a metallic sheet surfaced with a dull plate of a metal selected from the group consisting of iron, nickel, cobalt and alloys thereof containing not more than minor percentages of other metals. This dull plate surface is what actually constitutes the cathode of the galvanic cell; the basis metal serves to support the cathode surface. Ordinarily the plate would be electrodeposited upon a suitable ferrous basis metal such as ordinary mild steel sheet. Other metals available in sheet form, like copper, even magnesium itself, can serve alternatively as the basis metal on which to plate the cathode surface.

However, for preferred practice of the instant invention, dull nickel electroplated on magnesium itself or on steel sheet is the cathode element.

It has been determined that iron, nickel and cobalt are by far the best materials from which to form the dull or matte plate constituting the active cathode surface. More generally, these preferred materials may be plated individually or codeposited with minor percentages of an otherwise uncontemplated metal in the form of an alloy.

Within the intent of the term dull is included those finishes known to the electroplating art as dull, burnt, dendritic and matte. Rolled nickel, even after etching, results in comparatively low hydrogen generation rates. What is known as bright nickel plate is not materially better, nor is burnished plate. However, a commercially obtained matte nickel plate (on steel sheet) coupled to a nondescript magnesium alloy resulted in a hydrogen generation rate of about a liter per minute per square foot of anode area.

A specific advantage of forming the cathode elements as above described lies in the self-supporting nature of a thin metal sheet. Thus, a 12" by 6" nickel plated cathode can be roughly 12 mils in thickness (10 mils for the basis metal and 1 mil of Ni plate on each side), yet still be shock resistant and self-supporting. The reactive magnesium metal can constitute more than 60% of the total cell assembly weight and volume. Thus the galvanic cell assembly of the instant invention generates large quantities of hydrogen for its own weight and volume. Nonetheless, this assembly contains the high area of anode and cathode surface needed to generate the hydrogen in relatively brief periods of time.

Advantageously, extensive tests have demonstrated that plated surfaces of iron, nickel or cobalt are chemically inert to the electrolyte, retaining their activity throughout the useful life of the cell assembly. Indeed, if desired, the cathode elements can be removed and re-used in a new cell assembly. In the dry state these cathode materials and the magnesium anodes as well have virtually an indefinite shelf life. Therefore, the cell assembly can be easily shipped and then stored until needed.

In assembling the galvanic cell each individual cathode sheet is positioned face to face with a magnesium anode sheet spaced apart therefrom a distance of 0.1 to 20 millimeters. This spacing is quite important and should not be exceeded even when the magnesium has been almost entirely consumed by reaction with the water. In a sense, the requirement for proper spacing determines the maximum thickness for the magnesium sheet usable in the practice of the instant invention. The basic reason for the limitation on spacing resides in the internal voltage or IR drop through the electrolyte. Above a 20 millimeter spacing the electrical resistance of the electrolyte is so large as to reduce the hydrogen generation rate below a practical minimum. On the other hand, a spacing less than 0.1 millimeter is actually too close to allow generated hydrogen to escape through the electrolyte with any facility, again reducing the hydrogen generation rate. In addition, extremely close spacing is rather difficult to construct into a multiplate assembly.

Operation of the galvanic cell assembly as a hydrogen producer involves the continuing consumption of both metallic magnesium and water with with concomitant production of hydrogen and magnesium hydroxide. The hydrogen must be able to evolve freely and pass rapidly out of the electrolyte. Similarly the magnesium hydroxide which appears as a flocculant precipitate should be removed promptly from between each pair of electrodes in the galvanic cell assembly. Also, relatively minor quantities of water must be provided to maintain the cell assembly full of electrolyte at all times, and to make up the loss due to actual consumption of water in the reaction. However, much more substantial quantities of water must be provided to take up the heat of the magnesium-water reaction. All told the water-magnesium ratio must exceed 5:1. A lesser ratio of water to magnesium results in the presence of substantial quantities of water vapor in the product hydrogen. For maintaining a cool reaction ratios exceeding 10:1 should be employed.

Removal of hydrogen and magnesium hydroxide from between each pair of electrodes is effected by a proper cell construction which leaves the space between electrodes free, for bottom to top passage of electrolyte. Also the cell assembly is intended to be disposed inside the generator housing at a location beneath the electrolyte surface level but spaced above the housing floor and spaced also from the side walls of the housing. A free unburdened vertical passage is provided between the side or end walls (or both) of the housing and the cell assembly. This construction allows electrolyte to circulate cyclically from beneath the assembly up between each pair of electrodes and over the top of the cell assembly. Provision of top to bottom spacing elements at the side edges of the electrodes prevents lateral flow into or out of the cell assembly. Since the housing must be large enough to contain the requisite quantity of electrolyte, the assembly can be spaced from the walls so that electrolyte can flow down between the cell assembly and the housing walls to complete the cyclic flow path.

For further understanding of the instant invention, reference is now made to the drawing, wherein is illustrated diagrammatically the galvanic cell assembly disposed inside the generator housing.

As shown in the drawing, the galvanic cell assembly comprises a plurality of magnesium or magnesium alloy anodes 12, each spaced apart from an adjacent inert cathode 14 by vertical spacer elements 16 disposed adjacent the vertical side edges of the electrode pair. Desirably, each spacer element 16 extends substantially the entire vertical height of the electrodes. Importantly, there are no horizontal barriers against vertical movement of electrolyte into or out of the volume bounded by each anode 12, cathode 14 and their spacers 16. Electroltye can flow up freely through this volume.

The entire assembly is illustrated as being mounted centrally of generator housing 20 atop of an open framework 18 which in turn is raised up from the bottom 22 of the generator housing 20. Alternatively (not shown) the entire assembly may be suspended in the electrolyte from the lid 24 of the generator housing. In any event the assembly is spaced apart from the top, bottom and at least two (preferably all) side walls of generator housing 20. In operation, the cell assembly is entirely submerged beneath the top of the electrolyte. The generator housing 20 as a whole is sufficiently oversized relative to the cell assembly to contain the needed quantity of electrolyte. The lid 24 of generator housing 20 is provided with a valved outlet 26 through which the generated hydrogen leaves the housing. Desirably, the housing 20 itself contains a valved electrolyte inlet-outlet line 28 in or near the bottom thereof for either the addition of water or the removal of water to the electrolyte.

Aside from the more substantial quantity of water required principally for cooling purposes when the above described galvanic cell assembly is employed as a hydrogen generator, other differences exist between the above described device and the structure of a power producing battery (such as for example the type described in the aforementioned copending applications). As one noteworthy distinction, the instant device comprises a multiplate or multielement single cell. Another equally significant difference is that the cell is internally short circuited. Externally short circuiting an already assembled battery even made up as a single cell is not desirable because of the extremely high electrical currents involved. Generation of approximately 250 cubic feet of hydrogen in an hour involves passage of approximately 2500 ampere hours. When currents of this magnitude are involved, the resistance of even the best external short circuit has to be relatively high or the construction must be so massive as to be virtually impractical. An external IR voltage drop of even 0.1 volt for the galvanic cell constitutes a load which materially reduces the hydrogen generation rate. However, maximum rates are attained if the short were made internally, i.e., inside the electrolyte and on an electrode to electrode basis (i.e. individual anode to cathode). Relatively small current flows between each individual pair of electrodes (e.g. about 200 amperes) and the length of the electrical connection is low being equal to the electrode spacing distance of not more than about 20 millimeters. In the illustrated mode, such a shunt can be simply the flat portion of a knife blade pressed against the side edge of the assembly (not illustrated). This internal short circuit has a further advantage over any external circuit in that it is made and broken inside the electrolyte and therefore is free from the sparking hazards which exist when an external circuit is made or broken in what might be an explosive hydrogen-air atmosphere.

However, the preferred mode of the instant invention is to build the internal short circuit directly into the cell assembly by making the spacer members 16 out of an electrically conducting material. In the illustrated mode, copper wire of appropriate width (e.g. #15) is employed for the spacers 16. Forming the spacers of the electrically conducting material simultaneously arranges for the important spacer function and for the internal short circuit. An alternative mode (not illustrated) is to form a rolled, bent or beaded marginal edge directly on the vertical side edges of magnesium anode sheets or on the metal cathode sheets. These spacer elements, whether of copper or formed as an integral part of one electrode, should, of course, be elongated enough to provide a substantial barrier against lateral in-or-out flow of electrolyte at the side edges of the paired electrodes. By the same token their very length provides extremely low resistance electrical connections.

With the above described construction any desired number of galvanic couples can be assembled from paired magnesium and cathode sheets into one single cell assembly. Indeed, since the hydrogen generator is internally short circulated, there is virtually no limit to the number of electrode pairs which can be assembled into a cell assembly. This is because each pair of electrodes acts independently. Hydrogen evolving on both electrode surfaces creates a gas lift of sufficient force to draw electrolyte from beneath the assembly up through each electrode pair in the cell assembly. When the electrolyte flows up over the top of the cell assembly and back down alongside the cell assembly towards the bottom of housing 20, it carries with it the flocculent magnesium hydroxide product of the reaction. The Mg(OH)$_2$ ultimately settles out on the housing bottom 22.

Fresh electrolyte is always flowing up through the cell assembly serving to cool each pair of electrodes in the assembly. The electrolyte seems also to depolarize the electrodes by a mechanical effect, scrubbing the hydrogen away from the electrode surfaces. This electrolyte circulation is therefore what permits maintenance of the desired high current density.

Interestingly enough, the built-in short circuit arrangement preferred for the practice of the instant invention does not prevent maintenance of reasonable control over the reaction. The galvanic reaction can be halted completely by merely draining the electrolyte out of the inlet-outlet 28. Far less drastic, however, is control of the reaction rate through the salinity of the electrolyte. Thus, for example, a cell assembly employed under conditions where it is completely consumed in about two hours and generates approximately 500 cubic feet of hydrogen during the course of the reaction, can be slowed down or speeded up by adjustment of the electrolyte salinity. Since the above-mentioned exemplary consumption rate was predicated upon the electrolyte being about 20% sodium chloride in water, employment of a 5% salt solution as the electrolyte would sharply decrease the generating rate while employment of a saturated KCl brine would virtually double the hydrogen generation rate. To a substantial extent the hydrogen generation rate can be predetermined by appropriate selection of electrolyte salinity. Indeed even during operation, the reaction rate can be changed by draining out some of the salt water through outlet 28 and prompt replacement thereof with either fresher or saltier water.

As a specific example of the instant invention 44 sheets of 1/8" pure magnesium, 6" by 12" totalling 35 lbs. were paired with a like number (actually 45) 6" by 12" dull nickel electroplated steel sheets (about 0.010") into a single galvanic cell assembly. Copper wire side edge separators provided a 0.030" spacing. Immersed in a 55 gallon drum filled with a 20% NaCl solution, this galvanic cell assembly generated almost 500 cubic feet of hydrogen over a two hour period.

In another specific embodiment the basic structure was altered. For this assembly one surface of each magnesium sheet was plated with nickel according to known techniques,[1] then a dull nickel electroplate surfacing (0.5 mil) was added, effectively forming a bi-electrode. A total of 90 6" by 12" sheets (1/16" magnesium) so prepared were assembled with the copper wire into an internally short circuited battery (0.030" plate spacing). When employed to generate hydrogen the results were comparable to that of the previously described embodiment. Since each paired anode and cathode surface was individually short circuited the unit as a whole still amounted to one short circuited galvanic cell.

It is to be understood that various element changes may be made in the above-described structure without departing from the spirit of the invention or the appended claims.

[1] Techniques for plating on magnesium are described in a manual published by the Dow Chemical Co. (1958) entitled "Magnesium Finishing," pages 75-87.

What is claimed is:
1. A hydrogen generator comprising an enclosed housing, saline water inside said housing and a galvanic cell assembly submerged in said water beneath the surface level thereof and spaced above the floor of said housing, said assembly comprising a plurality of paired spaced apart magnesium anodes and inert metal cathodes, means associated with said assembly for providing a short circuit electrical connection directly between each adjacent anode-cathode pair in said assembly, the housing being sufficiently larger than said assembly to accommodate a weight ratio of saline water to magnesium of at least 5 to 1.

2. The generator of claim 1 wherein the anode-cathode pairs are simultaneously spaced apart and electrically connected by metallic wire spacers disposed adjacent the side edges of the pair.

3. A unit adapted to produce hydrogen when submerged in saline water which comprises a galvanic cell assembly made of a multiplicity of paired spaced apart magnesium anodes and inert metal cathodes and electrically conductive spacing elements adjacent the longitudinal side edges of each pair of plates, whereby a short circuit current flows directly between each pair, the cathodes each being a dull plated surface selected from the group consisting of nickel, cobalt, iron, and alloys thereof with minor percentages of other metals.

4. A unit adapted to produce hydrogen when submerged in saline water which comprises a galvanic cell assembly made of a multiplicity of paired spaced apart magnesium anode sheets and inert metal cathode sheets and electrically conductive spacing elements adjacent the longitudinal side edges of each pair of plates, whereby the short circuit current flows directly between each paired electrodes, the cathode sheets being a dull plated surface selected from the group consisting of nickel, cobalt, iron and alloys thereof with minor percentages of other metals.

5. The unit of claim 3 wherein each of the cathode surfaces is a dull nickel plate formed directly on the backside of a magnesium anode member.

References Cited by the Examiner

UNITED STATES PATENTS

| | | | |
|---|---|---|---|
| 1,214,934 | 2/1917 | Levin | 204—292 |
| 2,451,066 | 10/1948 | Butler | 204—248 |
| 2,938,066 | 5/1960 | Weigand | 136—161 |
| 3,026,259 | 3/1962 | Philips | 204—150 |
| 3,036,142 | 5/1962 | Goldenberg et al. | 136—100 |
| 3,207,149 | 9/1965 | Spindler | 126—263 |

FOREIGN PATENTS

| | | |
|---|---|---|
| 2,662 | 2/1885 | Great Britain. |
| 303,027 | 10/1928 | Great Britain. |
| 837,864 | 6/1960 | Great Britain. |
| 345,332 | 12/1936 | Italy. |

WINSTON A. DOUGLAS, *Primary Examiner.*

JOSEPH REBOLD, JOHN H. MACK, *Examiners.*

B. G. JOHNSON, A. B. CURTIS, A. SKAPARS,
*Assistant Examiners.*